(No Model.)
A. O. PACKARD.
MACHINE FOR SPRINKLING POTATO VINES WITH A POISONOUS SOLUTION.
No. 322,747. Patented July 21, 1885.
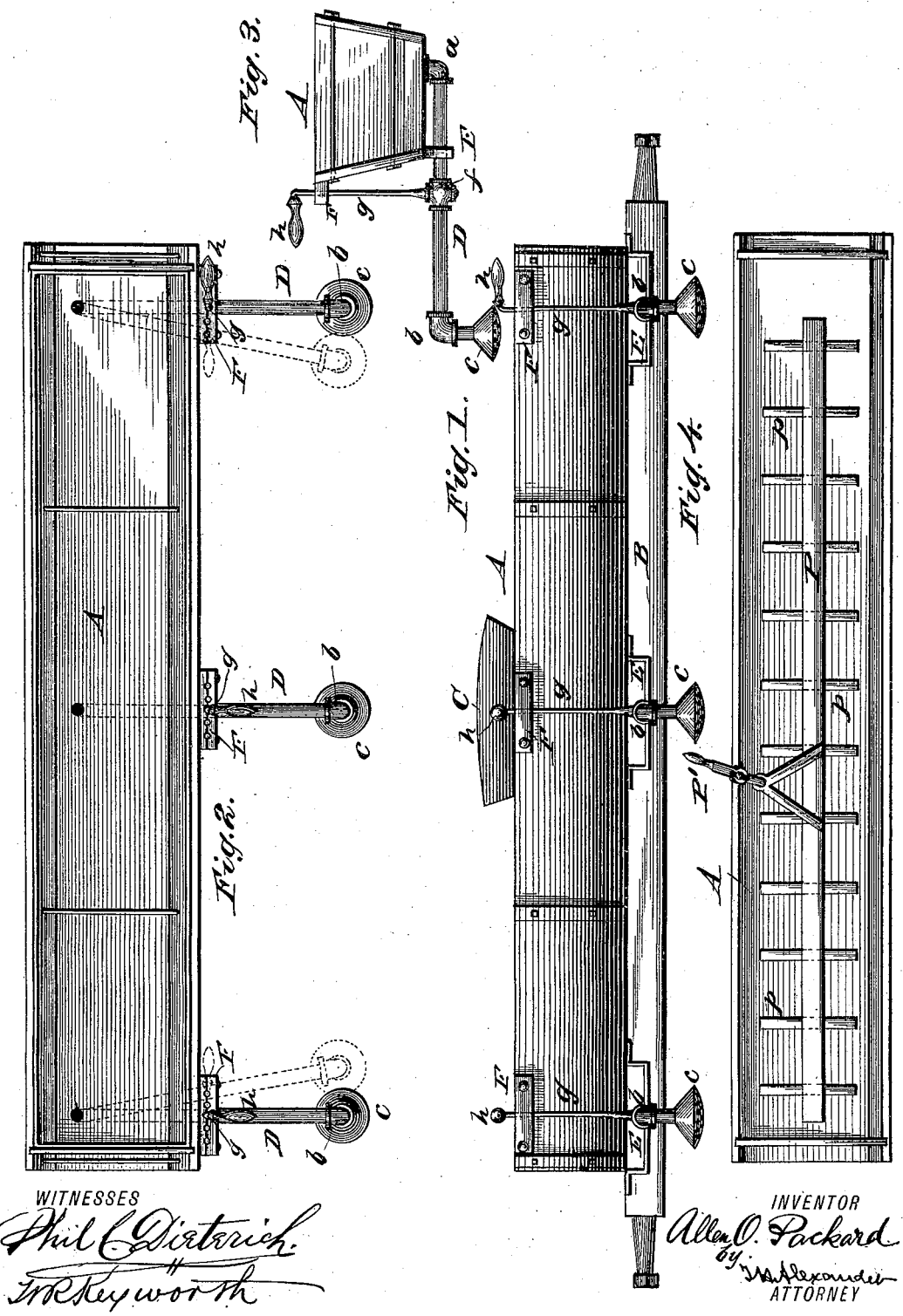
WITNESSES
INVENTOR
Allen O. Packard
ATTORNEY

UNITED STATES PATENT OFFICE.

ALLEN O. PACKARD, OF STEVENS POINT, WISCONSIN.

MACHINE FOR SPRINKLING POTATO-VINES WITH A POISONOUS SOLUTION.

SPECIFICATION forming part of Letters Patent No. 322,747, dated July 21, 1885.

Application filed July 26, 1884. (No model.)

*To all whom it may concern:*

Be it known that I, ALLEN O. PACKARD, of Stevens Point, in the county of Portage and State of Wisconsin, have invented certain new and useful Improvements in Machines for Sprinkling Potato-Vines with a Poisonous Solution; and I do hereby declare that the following is a full, clear, and exact description thereof, reference being had to the accompanying drawings, and to the letters of reference marked thereon, which form part of this specification, in which—

Figure 1 is a rear elevation of the sprinkler without the transporting-wheels and draft-tongue. Fig. 2 is a top view of Fig. 1 without the axle. Fig. 3 is a view of one end of the sprinkler. Fig. 4 is a top view of the trough, showing the agitator.

This invention relates to machines designed to sprinkle potato or other vines with a poisonous solution in order to kill the insects that infect such vines; and it consists in the construction and arrangement of parts hereinafter described, and pointed out in the appended claims.

A designates a trough or box, which should be made water-tight, and which may be made of any convenient length, and preferably provided with tightly-fitting covers. This trough or box is suitably secured to an axle, B, which is mounted on wheels, and provided with a draft-tongue. A seat, C, will be secured to the trough at the middle of its length for the attendant who drives the horses and regulates the sprinkling devices.

The sprinkling devices are constructed as follows: D D D designate discharge-pipes, which are jointed to couplings *a a a* located at the bottom of the trough A and arranged at equal distances apart. The rear extremities of said discharge-pipes have rose sprinkling-nozzles *c* secured to them by means of couplings *b*, for the purpose of distributing the poisonous solution in spray upon the vines. The pipes D are sustained in rear of the joint-couplings *a* by means of long loops or supports E, secured to the bottom of the trough A, which supports allow the sprinkling-nozzles, with their pipes D, to be adjusted laterally either to the right or left and sustained at any desired distance apart. Each one of the pipes is provided with a cock, *f*, adapted for regulating the flow of the solution from the trough A, or entirely cutting off the flow at the pleasure of the attendant, and the valve-plug for each cock, *f*, is provided with a long stem, *g*, which passes through a sectional guide-block, F, secured to the back of the trough A, at the upper end thereof, and which is provided with a handle, *h*, on its upper end. Each guide-block is provided with a number of vertical holes, and also with a removable cap, by removing which the stem *g* can be adjusted in any one of said holes, thereby adapting it to the position in which it is desired to have the sprinkler. It will be seen from the above description that I combine several laterally-adjustable sprinklers with a trough on which the attendant sits, who can conveniently regulate or entirely cut off the discharge of the liquid from any one or more of the sprinklers at pleasure. It will also be seen that the long stems of the cock-plugs and their sectional guide-blocks will hold the sprinklers in any position to which they may be adjusted.

P designates a long bar which is centrally-arranged on the bottom of the trough A, and provided with a number of arms, *p*. This constitutes a rack which is allowed to receive endwise motion, which is given it by the attendant grasping a hand-lever, P', and vibrating the same. The object of the rack is to thoroughly agitate and stir the poisonous solution in the trough so that the poison used will be thoroughly mixed with the water.

I am aware that machines to sprinkle poisonous solutions have been heretofore made, and that such machines have been provided both with devices to agitate the solution and with laterally-adjustable sprinklers. I do not, therefore, claim either of the latter broadly.

Having thus fully described my invention, what I claim as new and desire to secure by Letters Patent, is—

1. In a machine to sprinkle poisonous solutions over vines, the combination of a horizontal laterally-swinging sprinkling-tube, having the valve *f*, provided with the actuating-stem *g*, with the block F, provided with vertical holes which form bearings for the stem in different positions of the sprinkling-tube and hold the latter in place when set in any desired position, substantially as specified.

2. The combination, with the trough A, having a seat in a central position, and the sprinkling-tubes D, turning on the bottom of the trough by means of the joints $a$, and provided with the valves $f$, of the valve-stems $g$, provided with handles $h$ within easy reach of the driver, and the blocks F, provided with vertical holes forming bearings for the stems in different positions of the same, substantially as specified.

In testimony that I claim the foregoing as my own I affix my signature in presence of two witnesses.

ALLEN O. PACKARD.

Witnesses:
W. O. LAMOREUX,
JAMES E. GARDINER.